United States Patent
Lee

(10) Patent No.: US 11,875,816 B2
(45) Date of Patent: Jan. 16, 2024

(54) ELECTRONIC DEVICE AND METHOD FOR CONTROLLING THEREOF

(71) Applicant: Samsung Electronics Co., Ltd., Suwon-si (KR)

(72) Inventor: Kangwook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 17/422,020

(22) PCT Filed: Dec. 23, 2020

(86) PCT No.: PCT/KR2020/018985
§ 371 (c)(1),
(2) Date: Jul. 9, 2021

(87) PCT Pub. No.: WO2022/092440
PCT Pub. Date: May 5, 2022

(65) Prior Publication Data
US 2022/0343939 A1    Oct. 27, 2022

(30) Foreign Application Priority Data
Oct. 26, 2020   (KR) .................. 10-2020-0139595

(51) Int. Cl.
*G10L 25/30*   (2013.01)
*G10L 13/08*   (2013.01)
(Continued)

(52) U.S. Cl.
CPC ............ *G10L 25/30* (2013.01); *G06F 40/284* (2020.01); *G06N 3/02* (2013.01); *G10L 13/08* (2013.01)

(58) Field of Classification Search
CPC ........... G10L 25/30; G10L 13/08; G06N 3/02; G06F 40/284
See application file for complete search history.

(56) References Cited

U.S. PATENT DOCUMENTS 5,839,106 A    11/1998  Bellegarda
7,801,727 B2    9/2010  Gopalakrishnan et al.
(Continued)

FOREIGN PATENT DOCUMENTS

JP    2020-027168 A    2/2020
JP    2020-149680 A    9/2020
(Continued)

OTHER PUBLICATIONS

Jo et al., Cross-modal Variational Auto-encoder with Distributed Latent Spaces and Associators, May 2019, arXiv, whole document (Year: 2019).*
(Continued)

*Primary Examiner* — Sonia L Gay
(74) *Attorney, Agent, or Firm* — Jefferson IP Law, LLP

(57) ABSTRACT

An electronic device and a method for controlling thereof is provided. The electronic device includes a memory storing a neural network model and a processor configured to input, to the neural network model, input data to obtain output data, and, based on comparison between first output data based on input first modality and second output data based on input second modality, in response to the second modality being input, the neural network model is trained to output the first modality corresponding to the first output data, and the second modality may include at least one masking element.

13 Claims, 10 Drawing Sheets

(51) Int. Cl.
*G06N 3/02* (2006.01)
*G06F 40/284* (2020.01)

(56) References Cited

U.S. PATENT DOCUMENTS

| | | | |
|---|---|---|---|
| 8,095,364 | B2 | 1/2012 | Longe et al. |
| 10,522,167 | B1 | 12/2019 | Ayrapetian et al. |
| 10,599,393 | B2 | 3/2020 | Murillo et al. |
| 2014/0365215 | A1 | 12/2014 | Kim |
| 2018/0188948 | A1 | 7/2018 | Ouyang et al. |
| 2020/0097604 | A1 | 3/2020 | Lee et al. |
| 2020/0293826 | A1 | 9/2020 | Liu et al. |
| 2020/0335121 | A1 | 10/2020 | Mosseri et al. |
| 2021/0326751 | A1* | 10/2021 | Liu .................. G06N 3/084 |

FOREIGN PATENT DOCUMENTS

| KR | 10-2003-0021395 A | 3/2003 |
|---|---|---|
| KR | 10-1393255 B1 | 5/2014 |

OTHER PUBLICATIONS

Chuang et al., SpeechBert: An Audio-and-text Jointly Learned Language Model for End-to-end Spoken Question Answering, Aug. 2020, arXiv, whole docuement (Year: 2020).*

Peng et al.., CM-GANS:Cross-modal Generative Adversarial Networks for Common Representation Learning, Feb. 2019, ACM Trans. Multimedia Comput. Commun. Appl. 15, 1, Article, whole document (Year: 2019).*

Yung-Sung et al., "SpeechBERT: An Audio-and-text Jointly Learned Language Model for End-to-end Spoken Question Answering", (Interspeech 2020), Oct. 25-29, Shanghai, China.

Yi et al., "Almost Unsupervised Text to Speech and Automatic Speech Recognition", (ICML 2019), May 2019.

"Mask-Predict: Parallel Decoding of Conditional Masked Language Models," Ghazvininejad et al., Proceedings of the 2019 Conference on Empirical Methods in Natural Language Processing and the 9th International Joint Conference on Natural Language Processing; pp. 6112-6121; Nov. 2019.

International Search Report and written opinion dated Jul. 23, 2021, issued in International Application No. PCT/KR2020/018985.

* cited by examiner

ELECTRONIC DEVICE AND METHOD FOR CONTROLLING THEREOF

CROSS-REFERENCE TO RELATED APPLICATION(S)

This application is a U.S. National Stage application under 35 U.S.C. § 371 of an International application number PCT/KR2020/018985, filed on Dec. 23, 2020, which is based on and claims priority of a Korean patent application number 10-2020-0139595, filed on Oct. 26, 2020, in the Korean Intellectual Property Office, the disclosure of which is incorporated by reference herein in its entirety.

TECHNICAL FIELD

This disclosure relates to an electronic device and a method for controlling thereof. More particularly, the disclosure relates to an electronic device for obtaining output data through a neural network model and a controlling method thereof.

BACKGROUND ART

Recently, an electronic device performing an automatic speech recognition (ASR) function or a text to speech (TTS) function through a neural network model such as a deep neural network (DNN) has been developed.

The ASR function refers to a function of transforming an audio signal into text, and may be referred to as a speech to text (STT) function. The TTS function is a function of transforming text into an audio signal and outputting the audio signal.

In order to perform the ASR function, a related-art neural network model performs learning that outputs an appropriate text for an input audio signal, and performs learning to output an appropriate audio signal for the text input for execution of the TTS function.

However, when the neural network model is trained by inputting one of the text or the audio signal alone, it is possible to output improper data due to the phonetic similarity or morphological similarity of a text.

For example, when a user utters "Tom" to output "Tom" which is a name of a person, as a text, the related-art neural network model may output "tomb" which is phonetically similar to "Tom", and if a user inputs "Tom" as a text to output "Tom", which is a name of a person, as an audio signal, the related-art neural network model may output an audio signal for "tomb" after amendment of the text.

DISCLOSURE

Technical Problem

It is an object of the disclosure to provide an electronic device that may distinguish an audio signal having a phonetic similarity or a text having a morphological similarity by training a neural network model based on the text and audio signal as input data, and a method for controlling thereof.

Technical Solution

In accordance with an aspect of the disclosure, an electronic device is provided. The electronic device includes a memory storing a neural network model and a processor to input, to the neural network model, input data to obtain output data, and, based on comparison between first output data based on input first modality and second output data based on input second modality, in response to the second modality being input, the neural network model is trained to output the first modality corresponding to the first output data, and the second modality may include at least one masking element.

One of the first modality and the second modality may be a text, and other one may be an audio signal.

The neural network model may tokenize the text into a plurality of text elements, segment the audio signal into a plurality of audio elements, and mask at least one of the plurality of text elements or at least one of the plurality of audio elements.

The first modality may include a first text and the second modality comprises a first audio signal, and the neural network model is a model trained to output a second audio signal corresponding to the first text and a second text corresponding to the first audio signal with the first text composed of a plurality of tokenized text elements and the first audio signal in which at least one of segmented plurality of elements is masked as input data, and based on a first audio signal comprising the at least one masking element being input based on the comparison of the second audio signal and the second text, output a first text corresponding to the second audio signal.

The neural network model may perform learning, based on identification that the text corresponding to the second audio signal is not output with the output of the first audio signal including the at least one masking element, based on comparison between a plurality of audio elements included in the second audio signal and a plurality of text elements included in the second text.

The neural network model may output a text element corresponding to the masking element through the learning.

The first modality may include a first audio signal and the second modality may include a first text, and the neural network model may be a model trained to output a second text corresponding to the first audio signal and a second audio signal corresponding to the first text, with the first audio signal composed of a plurality of segmented audio elements and the first text in which at least one of the tokenized plurality of elements is masked as input data, and based on a first text signal comprising the at least one masking element being input based on the comparison of the second text and the second audio signal, output a first audio signal corresponding to the second text.

The neural network model may perform learning, based on identification that the audio signal corresponding to the second text is not output with the output of the first text including the at least one masking element, based on comparison between a plurality of text elements included in the second text and a plurality of audio elements included in the second audio signal.

The neural network model may output an audio element corresponding to the masking element through the learning.

In accordance with another aspect of the disclosure, a method of controlling an electronic device is provided. The method includes inputting input data to a neural network model and obtaining output data for the input data through computation of the neural network model, and, based on comparison between first output data based on input first modality and second output data based on input second modality, in response to the second modality being input, the neural network model is trained to output the first modality corresponding to the first output data, and the second modality may include at least one masking element.

One of the first modality and the second modality may be a text, and other one may be an audio signal.

The text may be tokenized into a plurality of text elements, the audio signal may be segmented into a plurality of audio elements, and at least one of the plurality of text elements or at least one of the plurality of audio elements may be masked and input to the neural network model.

The first modality may include a first text and the second modality may include a first audio signal, and the neural network model is a model trained to output a second audio signal corresponding to the first text and a second text corresponding to the first audio signal with the first text composed of a plurality of tokenized text elements and the first audio signal in which at least one of segmented plurality of elements is masked as input data, and based on a first audio signal comprising the at least one masking element being input based on the comparison of the second audio signal and the second text, output a first text corresponding to the second audio signal.

The neural network model may perform learning, based on identification that the text corresponding to the second audio signal is not output with the output of the first audio signal including the at least one masking element, based on comparison between a plurality of audio elements included in the second audio signal and a plurality of text elements included in the second text.

The neural network model may output a text element corresponding to the masking element through the learning.

The first modality may include a first audio signal and the second modality may include a first text, and the neural network model may be a model trained to output a second text corresponding to the first audio signal and a second audio signal corresponding to the first text, with the first audio signal composed of a plurality of segmented audio elements and the first text in which at least one of the tokenized plurality of elements is masked as input data, and based on a first text signal comprising the at least one masking element being input based on the comparison of the second text and the second audio signal, output a first audio signal corresponding to the second text.

The neural network model may perform learning, based on identification that the audio signal corresponding to the second text is not output with the output of the first text including the at least one masking element, based on comparison between a plurality of text elements included in the second text and a plurality of audio elements included in the second audio signal.

The neural network model may output an audio element corresponding to the masking element through the learning.

Effect of Invention

According to various embodiments as described above, an electronic device capable of distinguishing an audio signal having a phonetic similarity or a text having morphological similarity and a control method thereof are provided.

BEST MODE FOR CARRYING OUT THE INVENTION

The terms used in the present specification and the claims are general terms identified in consideration of the functions of embodiments of the disclosure. However, these terms may vary depending on intention, legal or technical interpretation, emergence of new technologies, and the like of those skilled in the related art. Some terms may be arbitrarily defined herein by an Applicant. The term may be interpreted as the meaning defined in this disclosure, and unless there is a specific definition of a term, the term may be construed based on the overall contents and technological common sense of those skilled in the related art.

In describing the disclosure, when it is decided that a detailed description for the known art related to the disclosure may unnecessarily obscure the gist of the disclosure, the detailed description of the known art may be shortened or omitted.

As used herein, terms such as "first," and "second," may identify corresponding components, regardless of importance or order, and are used to distinguish a component from another.

Also, the expression "configured to" used in the disclosure may be interchangeably used with other expressions such as "suitable for," "having the capacity to," "designed to," "adapted to," "made to," and "capable of," depending on cases.

A term such as "module," "unit," and "part," is used to refer to an element that performs at least one function or operation and that may be implemented as hardware or software, or a combination of hardware and software.

The disclosure is further described in detail with reference to accompanying drawings and the contents described in the accompanying drawings, but the disclosure is not limited thereto.

The disclosure will be described in detail with reference to the attached drawings.

Figure 1:
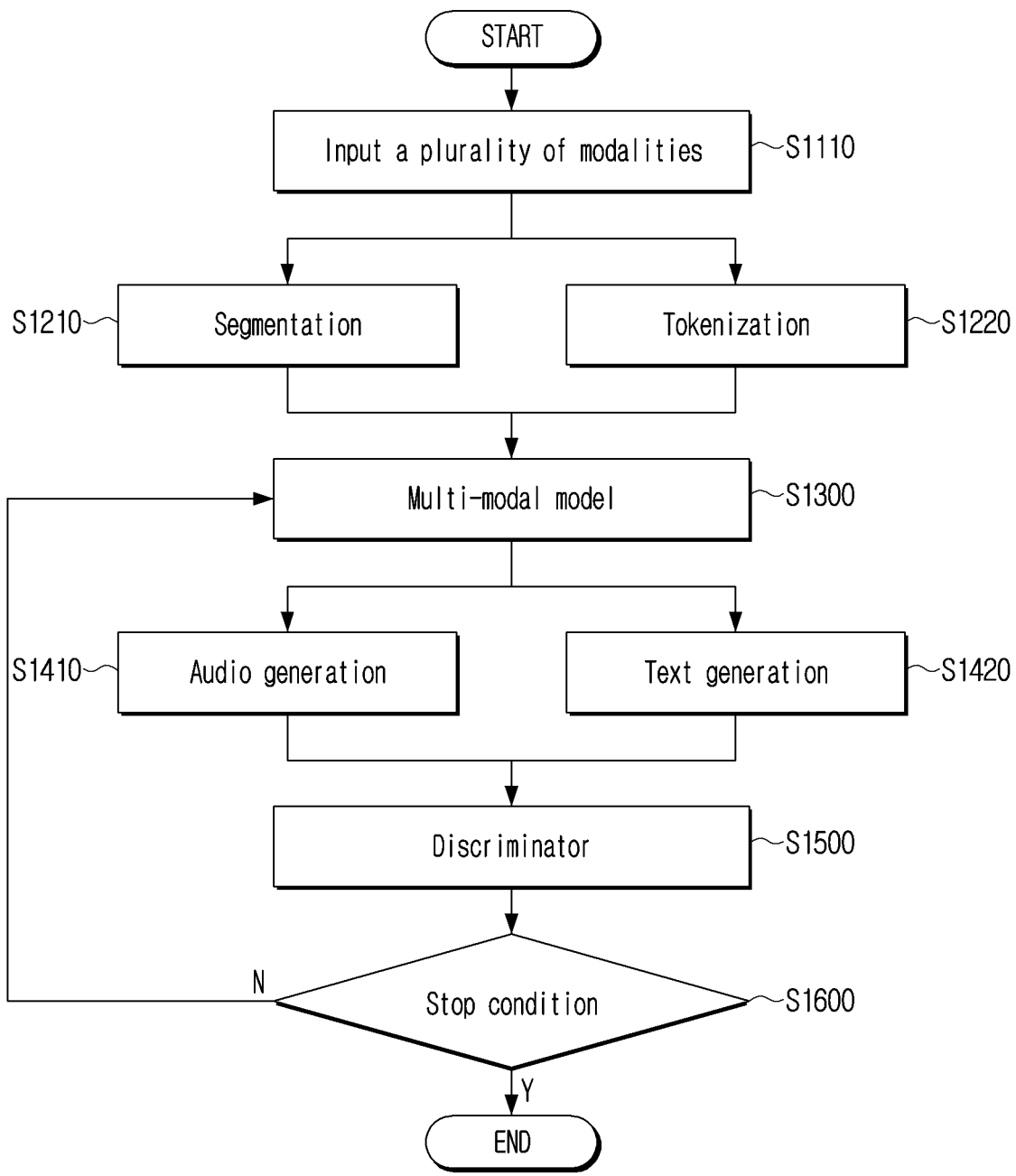
FIG. 1 is a flowchart illustrating an operation of an electronic device according to an embodiment of the disclosure.

FIG. 1 is a flowchart illustrating an operation of an electronic device according to an embodiment of the disclosure.

An electronic device 100 according to an embodiment is a device to obtain output data to input data using a neural network model and the electronic device 100 may be, for example, a desktop personal computer (PC), a notebook, a smartphone, a tablet PC, a server, or the like. Alternatively, the electronic device 100 may be implemented as a system itself in which clouding computer environment is established. In the meantime, the electronic device 100 is not limited to the above example, and any device capable of computing using an artificial intelligence (AI) model may be the device of the disclosure.

The electronic device 100 may perform learning of a neural network model. The neural network model is an AI model including an artificial neural network and may be trained by deep learning. For example, the neural network model may include at least one of deep neural network (DNN) recurrent neural network (RNN), convolution neural network (CNN), or generative adversarial networks (GAN). The neural network model may be an automatic speech recognition (ASR) model, a text to speech (TTS) model, a natural language processing (NLP) model, or the like, but is not limited thereto.

The neural network model may be included in the electronic device 100 in a form of an on-device. This is merely exemplary, and the neural network model may be included in an external device (e.g., server) communicatively connected to the electronic device 100.

Referring to FIG. 1, the electronic device 100 may input a plurality of modalities into a neural network model for learning of a neural network model in operation S1110. Here, the plurality of modalities may be an audio signal and a text as an example. The audio signal and the text may be in a corresponding (or paired) relationship with each other. For example, the electronic device 100 may input, to a neural network model, a text "spoon" and an audio signal corresponding to the text "spoon" as input data of the neural network model. The electronic device 100 may store a speech transcript in which audio signals are matched for each text.

For learning, the neural network model may perform preprocessing on the inputted plurality of modalities. When an audio signal and a text are inputted, the neural network may segment the input audio signal into a plurality of audio elements in operation S1210, and may tokenize the inputted text into a plurality of text elements in operation S1220. The segmentation of the audio signal may be, for example, phonetic segmentation, and the tokenization may be, for example, a tokenization of a grapheme unit, but the embodiment is not limited thereto.

For example, when a text "spoon" is inputted, a neural network model may obtain "s", "p", "oo", and "n" by tokenizing the text "spoon" in a grapheme unit, and when an audio signal corresponding to the text "spoon" is inputted, an audio element may be phonetic-segmented and the neural network model may obtain an audio element corresponding to "s", an audio element corresponding to "p", an audio element corresponding to "oo", and an audio element corresponding to "n".

The neural network model may mask at least one of a plurality of audio elements or at least one of a plurality of text elements. The neural network model may replace at least one of the plurality of audio elements with a mask element, or replace at least one of the plurality of text elements with a mask element.

For example, when the text "spoon" and the audio signal corresponding to the text "spoon" are inputted as described above, the neural network model may replace at least one of "s", "p", "oo", and "n" obtained through the tokenization of the text with a mask element. Alternatively, the neural network model may replace at least one of an audio element corresponding to "s" obtained through segmentation of an audio signal, an audio element corresponding to "p", an audio element corresponding to "oo", and an audio element corresponding to "n" with a mask element.

The neural network model may input a text composed of a plurality of tokenized text elements, and an audio signal in which at least one of the segmented plurality of audio elements is masked to an input layer of a neural network model (e.g., a multi-modal model or a cross-modal model) in operation S1300. Alternatively, the neural network model may input an audio signal composed of a plurality of segmented audio elements and a text in which at least one of a plurality of tokenized text elements is masked to an input layer of the neural network model in operation S1300.

The neural network model may perform learning with text composed of a plurality of tokenized text elements and an audio signal in which at least one of the segmented plurality of audio elements is masked as input data. Alternatively, the neural network model may perform learning with an audio signal composed of a plurality of segmented audio elements and a text in which at least one of a plurality of tokenized text elements is masked as input data.

It will be described that a text (hereinafter, referred to as a first text) composed of a plurality of tokenized text elements and an audio signal in which at least one of the segmented plurality of audio elements is masked (hereinafter, first audio signal) are input.

In this case, the neural network model may output a second audio signal corresponding to the first text through a neural network operation in operation S1410 and output a second text corresponding to the first audio signal in operation S1420. Specifically, the neural network model may output a plurality of audio elements corresponding to a plurality of text elements through a neural network computation with a plurality of text elements as input data, and may output a plurality of text elements corresponding to the mask elements and a plurality of text elements corresponding to the plurality of unmasked audio elements through neural network computation, with at least one mask element and a plurality of unmasked audio elements (according to an embodiment, the unmasked audio element may be singular) as input data.

The neural network model may compare the output second audio signal (including a plurality of audio elements) and a second text (including a plurality of text elements) and may identify whether a second text corresponding to the second audio signal is output in operation S1500. Specifically, the neural network model may compare a plurality of audio elements constituting the outputted second audio signal and a plurality of text elements constituting the outputted second text. For example, if first to fourth audio elements are included in the second audio signal and fifth to eighth text elements are included in the second text, the neural network model may identify whether the fifth text element corresponds to the first audio element, identify whether the sixth text element corresponds to the second audio element, identify whether the seventh text element corresponds to the third audio element, and identify whether the eighth text element corresponds to the fourth audio element.

When it is identified that the plurality of text elements constituting the second text do not correspond to the plurality of audio elements constituting the second audio signal, the neural network model may perform learning in operation S1600-N. The neural network model may learn to output a first text corresponding to a second audio signal when the first audio signal including the at least one masking element is input as the input data. The learning may be performed as correcting at least one weight of the plurality of layers constituting the neural network model to output the first text with the first audio as input data, and the computation of the weight may be performed by the processor of the electronic device 100.

In the embodiment described above, if the fifth text element corresponds to the first audio element, the sixth text element does not correspond to the second audio element, the seventh text element does not correspond to the third audio element, and the eighth text element corresponds to the fourth audio element, the neural network model may perform learning to correct the weight of the plurality of layers that constitute the neural network model such that the sixth text element is output as the output for the second audio element and the seventh text element is output as the output for the third audio element. Here, the second audio element and the third audio element may be masked elements.

If it is identified that a plurality of text elements constituting the outputted second text correspond to a plurality of audio elements constituting the second audio signal after learning, the neural network model may terminate learning in operation S1600-Y. Even before learning, if the plurality of text elements constituting the outputted second text correspond to a plurality of audio elements constituting the second audio signal, the neural network model may terminate a learning procedure without performing learning.

If a text (hereinafter, first text) in which at least one of a plurality of segmented audio signals (hereinafter, first audio signal) and the plurality of tokenized text elements is masked is input, the technical idea similar to that of the technical idea described above may be applied in the same manner.

The neural network model may output a second text corresponding to the first audio signal through a neural network operation in operation S1410 and output a second audio signal corresponding to the first text in operation S1420. Specifically, the neural network model may output a plurality of text elements corresponding to the plurality of audio elements with the plurality of audio elements as input data, and may output audio elements corresponding to the mask elements and a plurality of audio elements corresponding to the unmasked plurality of text elements with the at least one mask element and a plurality of unmasked text elements (according to an embodiment, the unmasked text element may be singular) as input data.

The neural network model may compare the output second text (which includes a plurality of text elements) and the second audio signal (including a plurality of audio elements) to identify whether the second audio signal corresponding to the second text is output in operation S1500. The neural network model may compare a plurality of text elements constituting the outputted second text and a plurality of audio elements constituting the outputted second audio signal. For example, when the first to fourth audio elements are included in the second audio signal and the fifth to eighth text elements are included in the second text, the neural network model identify whether the first audio element corresponds to the fifth text element, identify whether the second audio element corresponds to the sixth text element, identify whether the third audio element corresponds to the seventh text element, and identify whether the fourth audio element corresponds to the eighth text element.

If it is identified that the plurality of audio elements constituting the second audio signal do not correspond to a plurality of text elements constituting the second text, the neural network model may perform learning of the neural network model in operation S1600-N. Specifically, the neural network model may learn to output a first audio signal corresponding to a second text signal when a first text including the at least one masking element is input. Here, the learning may be a task of correcting at least one weight of a plurality of layers constituting a neural network model to output a first audio signal with the first text as input data.

In the embodiment described above, if the first audio element corresponds to the fifth text element, the second audio element does not correspond to the sixth text element, the third audio element does not correspond to the seventh text element, and the fourth audio element corresponds to the eighth text element, the neural network model may perform learning to correct the weight of the plurality of layers that constitute the neural network model such that the sixth audio element is output as the output of the second text element and the seventh audio element is output as the output for the third text element. The second text element and the third text element may be masked elements.

When it is identified that the plurality of audio elements constituting the outputted second audio signal correspond to a plurality of text elements constituting the second text after learning, the neural network model may terminate learning in operation S1600-Y. Even prior to learning, if the plurality of audio elements constituting the outputted second audio signal correspond to a plurality of text elements constituting the second text, the neural network model may terminate the learning procedure without performing learning.

As such, the disclosure, by training the neural network model with the text and audio signal as input data (this may be called cross-modality learning) may distinguish between audio signals or text having similarities. For example, in order to learn "Tom" which is a name of a person, by training the neural network model by masking at least one of text elements "T", "o", "m" constituting the text "Tom", audio element corresponding to "T", audio element corresponding to "o", and an audio element corresponding to "m" the neural network model of the disclosure may output the audio signal "Tom" as the text "Tom" and may prevent error of outputting "tomb" which has a phonetic similarity. In addition, by training the neural network model by masking at least one of the audio element corresponding to "T", the audio element corresponding to "o", the audio element corresponding to "m" and at least one of "T", "o", and "m" which are text elements constituting "Tom", the neural network model of the disclosure may output the text "Tom" as the audio signal "Tom", and may prevent outputting the audio signal "tomb" by correcting the text "Tom" to "tomb".

Figure 2:
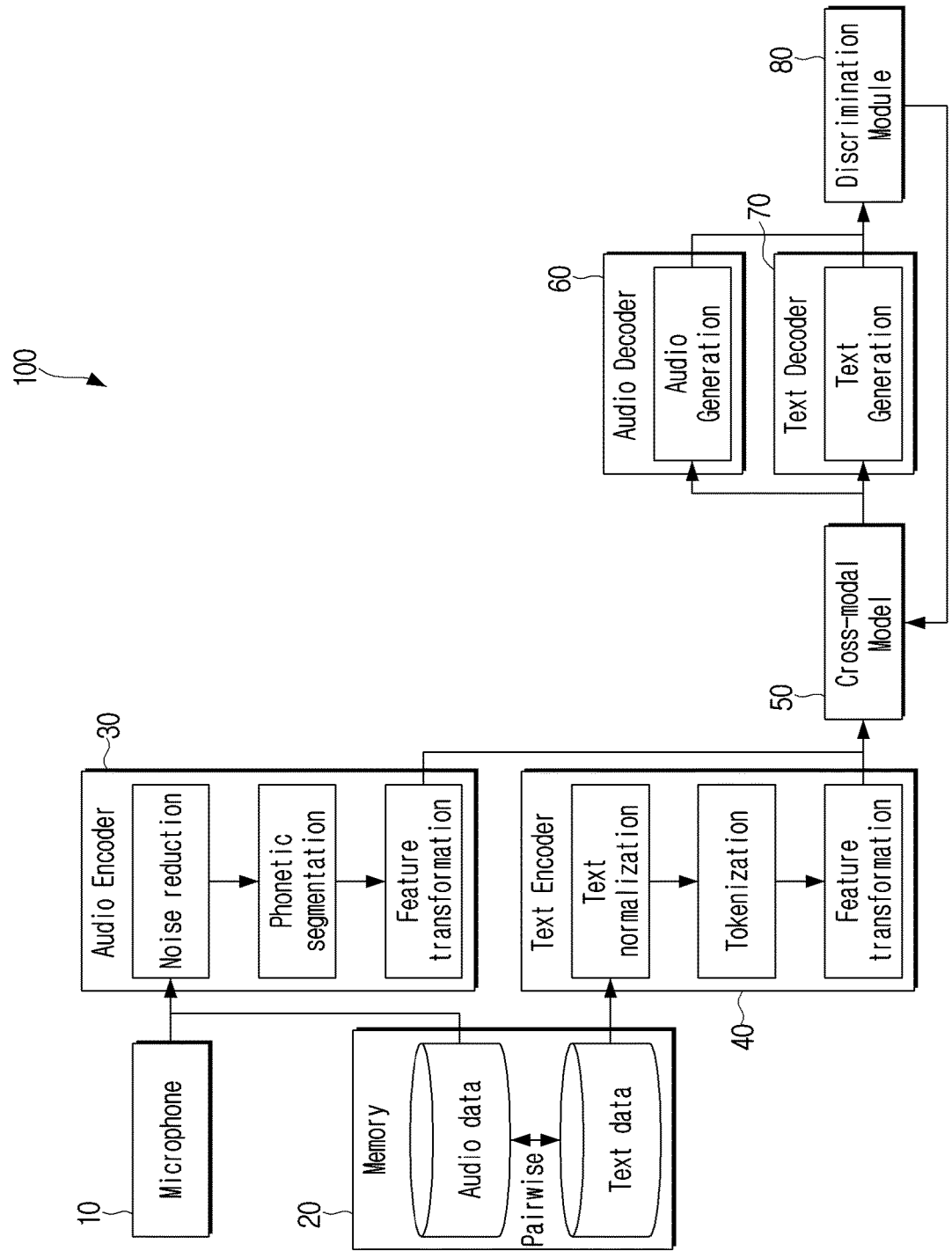
FIG. 2 is a diagram illustrating architecture of a hardware/software module constituting an electronic device according to an embodiment of the disclosure.

Referring to FIG. 2, the neural network model will be described in greater detail.

FIG. 2 is a diagram illustrating architecture of a hardware/software module constituting an electronic device according to an embodiment of the disclosure.

Referring to FIG. 2, the electronic device 100 includes a memory 20 and may transmit the audio data stored in the memory 20 to an audio encoder 30. The electronic device 100 may transmit text data stored in the memory 20 to a text encoder 40. Here, the transmitted audio data and text data may be learning data for learning of a neural network model. The audio data transmitted to the audio encoder 30 may have a relationship (or pairing relationship) corresponding to the text data transmitted to the text encoder 40.

The electronic device 100 of the disclosure may include a microphone 10 and may transmit the user voice received through the microphone 10 to the audio encoder 30. The user voice received through the microphone 10 may be input to the neural network model together with the text in the learning step, and may be input to the neural network model in an inference step after learning of the neural network model.

The audio encoder 30 may perform preprocessing of the audio signal. Specifically, the audio encoder 30 may remove noise of an audio signal (which may be the user voice or audio data described above), segment the audio signal into a plurality of audio elements and transfer features of the plurality of audio elements. Here, noise removal may refer to transforming the audio signal into a frequency domain and then extracting an area corresponding to a voice frequency. The embodiment is not necessarily limited thereto, and various tools that may remove noise included in the audio signal, such as noise canceling, or the like, may be used for the noise removal. The segmentation of the audio signal may be a phonetic segmentation operation that segments the audio signal into a plurality of audio elements corresponding to a plurality of text elements. The feature transformation is to transform each audio element into a vector, and the electronic device 100 may store a plurality of vectors corresponding to the plurality of audio elements.

The text encoder 40 may perform preprocessing of the text. The text encoder 40 may perform normalization of the text, tokenize the text into a plurality of text elements, and perform a feature transformation for the plurality of text elements. The normalization of the text may be a task of changing a capital letter to a small letter included in the text, removing an unnecessary element included in the text (e.g., a special character that is not a natural language and has no particular meaning, etc.), and the tokenization is segmenting a text into a plurality of text elements by a predetermined unit, here the unit may be a grapheme unit, but is not limited thereto. The feature transformation is to transform each text element into a vector, and the electronic device 100 may store a plurality of vectors corresponding to a plurality of text elements.

The audio encoder 30 and the text encoder 40 may be, for example, a part of a neural network model as a software module. However, according to an embodiment, the audio encoder 30 and the text encoder 40 may be implemented as a hardware module, and may be stored in the memory 20 as a software module separate from the neural network model.

The neural network model 50 (e.g., it may be referred to as a cross-modal model) may mask at least one of a plurality of audio elements (specifically, a plurality of vectors corresponding to the plurality of audio elements) generated by the audio encoder 30 or at least one of a plurality of text elements (specifically, a plurality of vectors corresponding to the plurality of audio elements) generated by the text encoder 40.

The neural network model 50 may output a plurality of audio elements corresponding to the plurality of text elements and a plurality of text elements corresponding to the plurality of audio elements in which at least one element is masked, with the plurality of text elements and at audio elements in which at least one element is masked as input data. Here, the plurality of output audio elements and the plurality of text elements may be represented by a vector.

The audio decoder 60 may transform a plurality of audio vectors output by the neural network model 50 into a plurality of audio elements (which may be a wave signal or an analog signal) and the text decoder 70 may transform the plurality of text vectors output by the neural network model 50 into a plurality of text elements.

A discrimination module 80 may compare the plurality of audio elements generated by the audio decoder 60 and the plurality of text elements generated by the text decoder 70, and may identify whether the plurality of audio elements and the plurality of text elements have a corresponding relationship (or pairing relationship). The discrimination module 80 may provide information on the identification result to the neural network model 50, and the neural network model 50 may perform learning to adjust the values of the plurality of weights constituting the neural network model 50 based on the information received from the discrimination module 80.

The audio decoder 60 and the text decoder 70 may be part of a neural network model, as an example of a software module. However, according to an embodiment, the audio decoder 60 and the text decoder 70 may be implemented as hardware modules and may be stored in the memory 20 as a software module separate from the neural network model.

The discrimination module 80 is a software module and may be a part of a neural network model, and may be implemented as a hardware module according to an embodiment, and may be stored in the memory 20 as a software module separate from the neural network model.

Figure 3:
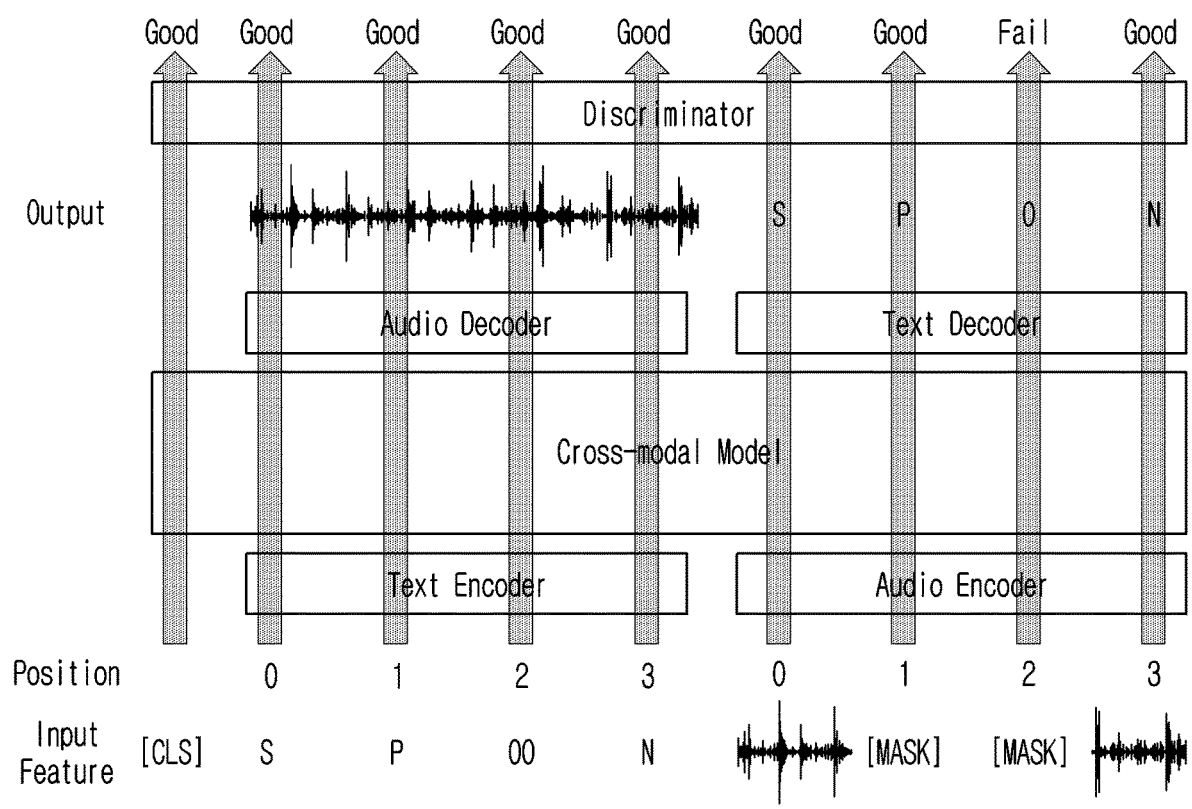
FIG. 3 is a diagram illustrating an embodiment of masking at least one audio element according to an embodiment of the disclosure.

FIG. 3 is a diagram illustrating an embodiment of masking at least one audio element according to an embodiment of the disclosure.

The neural network model may receive a text and an audio signal in a learning stage. For example, the neural network model may receive a text "spoon" and an audio signal corresponding to the text "spoon".

The neural network model may tokenize the text "spoon" to a plurality of text elements via a text encoder. As an example, the neural network model may obtain "s", "p", "oo", and "n" by tokenizing the text "spoon" in a grapheme unit.

The neural network model may segment an audio signal corresponding to a text "spoon" through an audio encoder into a plurality of audio elements. For example, the neural network model may segment an audio signal corresponding to "spoon" into an audio element corresponding to "s", an audio element corresponding to "p", an audio element corresponding to "oo", and an audio element corresponding to "n".

The neural network model may mask at least one of the plurality of audio elements. For example, referring to FIG. 3, the neural network model may replace an audio signal corresponding to "p" with a first mask element, and replace an audio signal corresponding to "oo" with a second mask element.

The neural network model may input a plurality of text elements, at least one mask element, and at least one audio element to an input layer to obtain output data. Specifically, the neural network model may output a plurality of audio elements corresponding to a plurality of text elements by performing a computation of a neural network model with a plurality of text elements as input. As an example, the neural network model may output an audio element corresponding to "s", an audio element corresponding to "p", an audio element corresponding to "oo", and an audio element corresponding to "n" with the input of "s", "p", "oo", and "n". The neural network model may output a plurality of text elements corresponding to the at least one mask element and at least one audio element by performing computation of the neural network model with at least one mask element and at least one audio element as input. As an example, the neural network model may output texts such as "s", "p", "o", n" with the audio element corresponding to "s", a first mask element, a second mask element, and an audio element corresponding to "n" as input.

The neural network model may compare the output plurality of audio elements and the plurality of text elements. The neural network model may identify whether the plurality of audio elements and the plurality of text elements output are in a corresponding relationship to each other through a discriminator (this may be referred to as a discriminator layer or a discrimination module).

The neural network model may identify at least one text element not corresponding to a plurality of audio elements output among the plurality of outputted text elements. In the above-described embodiment, the neural network model may identify that the text "o" obtained as an output for the second mask element is a relationship that does not correspond to the audio element obtained as the output of the text "oo". In this case, the neural network model may be trained to output a plurality of text elements corresponding to the output plurality of audio elements, that is, texts such as "s", "p", "oo", and "n" with the audio element corresponding to "s", the first mask element, the second mask element, and the audio element corresponding to "n" as input.

Through such learning, the neural network model may output the appropriate text as an input for the audio signal that includes the masking element, which may prevent an error of outputting a text that is different from the user intention due to phonetic similarity.

Figure 4:
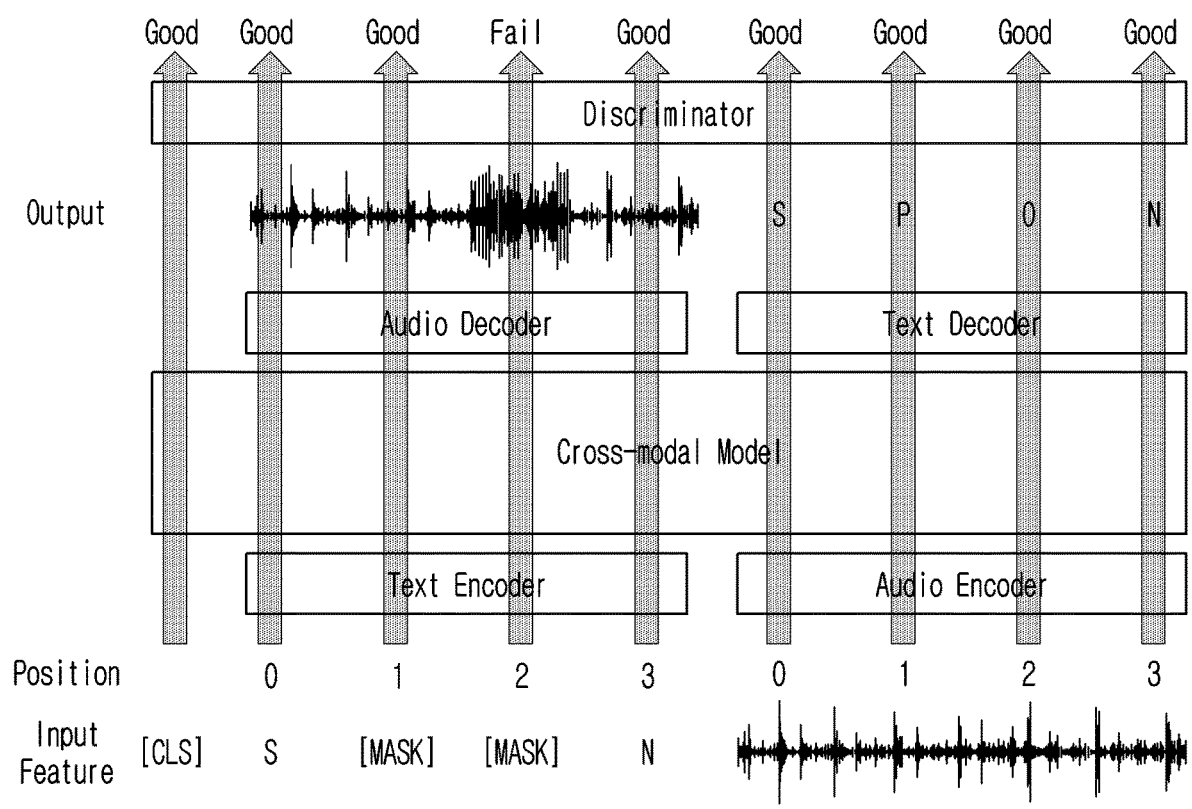
FIG. 4 is a diagram illustrating an embodiment of masking at least one text element according to an embodiment of the disclosure.

FIG. 4 is a diagram illustrating an embodiment of masking at least one text element according to an embodiment of the disclosure.

The neural network model may receive text and audio signals in a learning step. For example, the neural network model may receive the text "spoon" and the audio signal corresponding to the text "spoon".

The neural network model may tokenize the text "spoon" into a plurality of text elements through the text encoder. For example, the neural network model may obtain "s", "p", "oo", and "n" by tokenizing the text "spoon" in a grapheme unit.

The neural network model may segment an audio signal corresponding to the text "spoon" into a plurality of audio elements through an audio encoder. For example, the neural network model may segment an audio signal corresponding to "spoon" into an audio element corresponding to "s", an audio element corresponding to "p", an audio element corresponding to "oo", and an audio element corresponding to n.

A neural network model may mask at least one of a plurality of text elements. For example, referring to FIG. 4, the neural network model may replace the text "p" with the first mask element and replace the text "oo" with the second mask element.

The neural network model may input at least one mask element, at least one text element, and a plurality of audio elements to the input layer to obtain output data. Specifically, the neural network model may output an audio element corresponding to each element by performing computation of the neural network model with at least one mask element and at least one text element as input. For example, with the input of "s", the first mask element, the second mask element, and "n", the neural network model may output an audio element corresponding to "s", an audio element corresponding to the first mask element, an audio element corresponding to the second mask element, and an audio element corresponding to "n".

The neural network model may input a plurality of audio elements to output a plurality of text elements corresponding to the plurality of audio elements by performing computation of the neural network model. As an example, with an audio element corresponding to "s", an audio element corresponding to "p", an audio element corresponding to "oo", and an audio element corresponding to "n" as input, the neural network model may output text such as "s", "p", "oo", and "n".

The neural network model may compare the output plurality of audio elements and the plurality of text elements. Specifically, the neural network model may identify whether the outputted plurality of audio elements and the plurality of text elements are corresponding to each other through a discriminator.

The neural network model may identify at least one audio element not corresponding to the output plurality of text elements, among the plurality of output audio elements. In the above-described embodiment, the neural network model may identify that the audio element corresponding to the "o" obtained as the output for the second mask element is in a relationship that does not correspond to the text element obtained by the output of the audio element corresponding to "oo". In this example, the neural network model may be trained to output audio elements corresponding to the plurality of output text elements, that is, an audio element corresponding to "s", audio element corresponding to "p", audio element corresponding to "oo", and audio element corresponding to "n", with the text "s", the first mask element, the second mask element, and the text "n" as input.

Through learning as above, the neural network model may output an appropriate audio signal as an input to the text including the masking element, which may prevent an error of outputting an audio signal different from the user intention due to morphological similarity.

Figure 5:
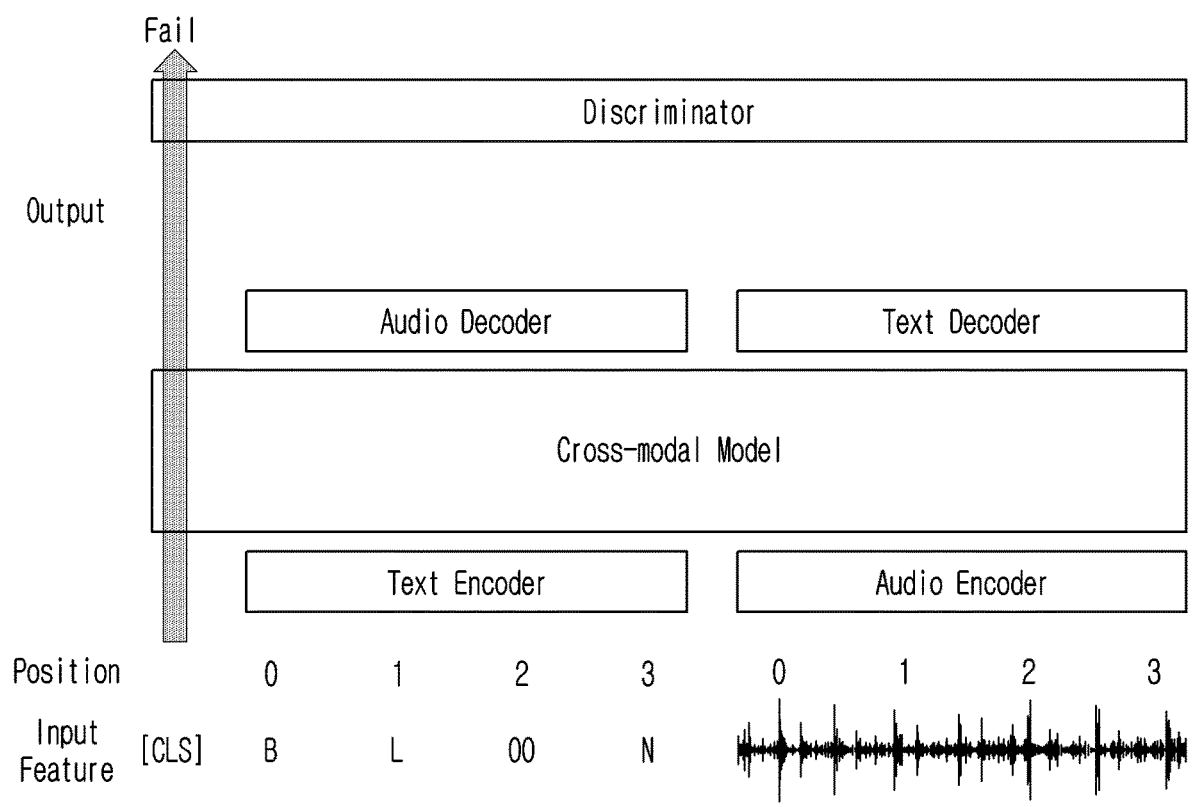
FIG. 5 is a diagram illustrating an operation of inputting a text and an audio signal not corresponding to each other according to an embodiment of the disclosure.

FIG. 5 is a diagram illustrating an operation of inputting a text and an audio signal not corresponding to each other according to an embodiment of the disclosure.

In the embodiment above, an operation of the neural network model based on an example of inputting a text and an audio signal in a corresponding relationship is described.

However, text and audio signals that do not correspond to each other may be input to the neural network model. As an example, referring to FIG. 5, the text input for learning is "bloon" and the audio signal input for learning is an audio signal corresponding to "spoon."

In this example, the neural network model may terminate the learning procedure without performing the cross-modality learning described above. The neural network model may identify whether the text corresponds to an audio signal or whether an audio signal corresponds to a text prior to pre-processing (i.e., text torque or audio signal segmentation, etc.) for training when a text and an audio signal are input.

The neural network model, if it is identified that the text and the audio signal are not in a corresponding relationship, may not perform pre-processing for learning or learning, and may terminate a procedure for learning.

The neural network model may perform learning for the input text and the audio signal if it is identified that the text and the audio signal are in a corresponding relationship.

Accordingly, the neural network model may prevent errors of output data that may occur due to learning of text and audio signals that are not in a corresponding relationship, and may prevent unnecessary computations of the processor.

Figure 6:
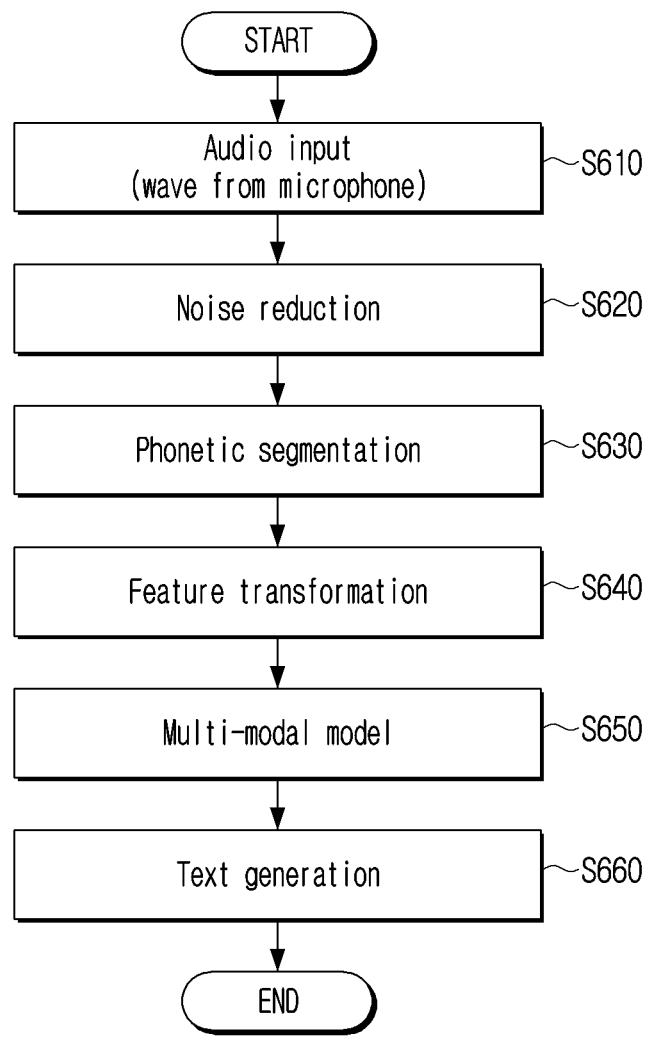
FIG. 6 is a flowchart illustrating an embodiment of providing an ASR function through the neural network model trained according to an embodiment of the disclosure.

FIG. 6 is a flowchart illustrating an embodiment of providing an ASR function through the neural network model trained according to an embodiment of the disclosure.

The electronic device 100 may receive an audio signal corresponding to the user voice through the microphone 10 in operation S610. The audio signal corresponding to the user voice may be an analog signal (or wave signal).

The electronic device 100 may input an audio signal corresponding to a user voice into the neural network model. In this case, the neural network model may perform preprocessing for audio signal processing. Specifically, the neural network model may remove noise included in the audio signal in operation S620. Here, the removal of noise may be an example of transforming an audio signal into a frequency domain and extracting an area corresponding to a voice frequency.

The neural network model may segment the audio signal into a plurality of audio elements in operation S630. As an example, a neural network model may perform phonetic segmentation for an audio signal.

The neural network model may perform a feature transformation of the plurality of audio elements in operation S640. Here, the feature transformation is an operation of transforming each audio element into a vector, so that the electronic device 100 may store a plurality of vectors corresponding to the plurality of audio elements.

The neural network model may input a plurality of vectors to an input layer of a neural network model to perform a computation of the neural network model in operation S650, and generate a text corresponding to the plurality of vectors in operation S660. The neural network model may output text corresponding to the input audio signal based on the weight values included in the plurality of layers and the computation of the plurality of vectors inputted to the input layer.

Figure 7:
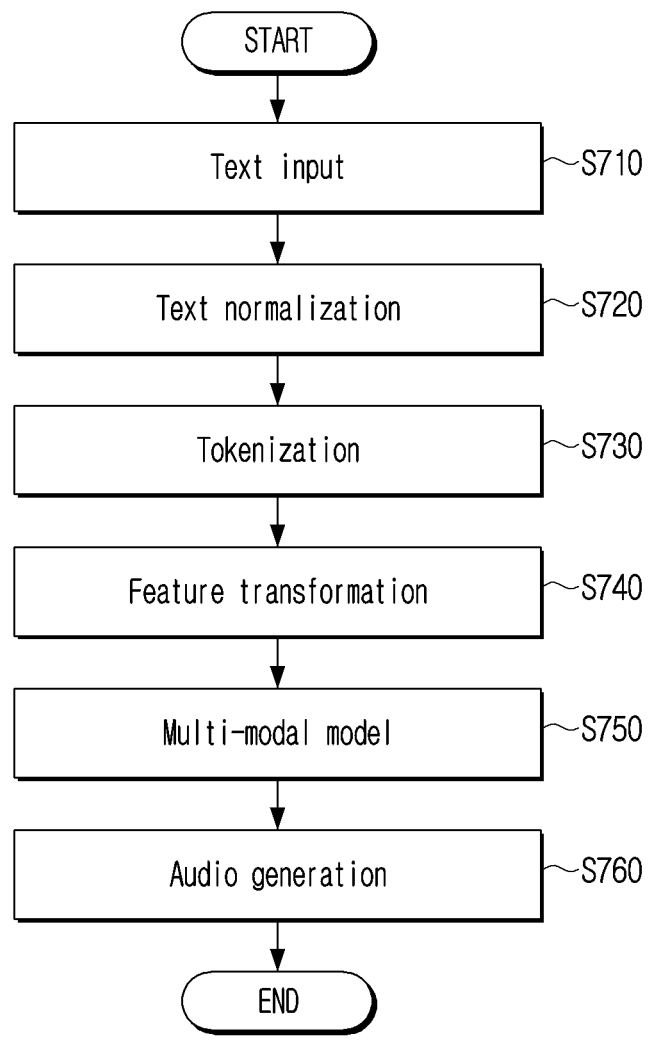
FIG. 7 is a flowchart illustrating an embodiment of providing a TTS function through the trained neural network function according to an embodiment of the disclosure.

FIG. 7 is a flowchart illustrating an embodiment of providing a TTS function through the trained neural network function according to an embodiment of the disclosure.

The electronic device 100 may receive text through an inputter (not shown) in operation S710. The inputter (not shown) may be a keyboard, for example, but is not limited thereto, and may be implemented with various devices capable of receiving user input, such as a touch screen, a touch pad, a soft keyboard, and the like.

The electronic device 100 may enter text into a neural network model. In this case, the neural network model may perform preprocessing for text processing. Specifically, the neural network model may perform the normalization of the text in operation S720. The normalization of the text may be changing of a capital character included in a text to a small character, removing an unnecessary element included in the text (e.g., a special character that is not a natural language and has no particular meaning, etc.) and the like.

The neural network model may tokenize the text into a plurality of text elements in operation S730. Here, the tokenization refers to segmenting a text into a plurality of text elements by a predetermined unit, wherein the unit may be a grapheme unit, but is not limited thereto.

The neural network model may perform a feature transformation of the plurality of text elements in operation S740. The feature transformation is an operation of transforming each text element into a vector, so that the electronic device 100 may store a plurality of vectors corresponding to a plurality of text elements.

The neural network model may input a plurality of vectors to an input layer of a neural network model to perform an operation of the neural network model in operation S750, and generate an audio signal corresponding to the plurality of vectors in operation S760. Specifically, the neural network model may output an audio signal corresponding to the input text based on the weight values included in the plurality of layers and the computation of the plurality of vectors inputted to the input layer.

Figure 8:
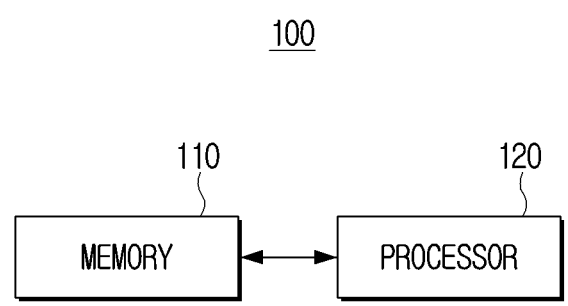
FIG. 8 is a block diagram illustrating an electronic device according to an embodiment of the disclosure.

FIG. 8 is a block diagram illustrating an electronic device according to an embodiment of the disclosure.

Referring to FIG. 8, the electronic device 100 according to an embodiment includes the memory 110 and the processor 120.

At least one instruction may be stored in the memory 110. An operating system (O/S) for driving the electronic device 100 may be stored in the memory 110. The memory 110 may be stored with a software program or application for executing various embodiments of the disclosure. The memory 110 may include a semiconductor memory such as a flash memory or a magnetic storage medium such as a hard disk.

A software module for executing various embodiments of the disclosure may be stored in the memory 110, and the processor 120 may execute the software module stored in the memory 110 to control the operation of the electronic device 100. The memory 110 may be accessed by the processor 120, and reading/writing/modifying/updating, or the like, of data by the processor 120 may be performed.

In the disclosure, the term memory 110 may be used to include read-only memory (ROM, not shown) in the processor 120, random access memory (RAM, not shown), or a memory card (not shown), (for example, a micro secure digital (SD) card, and a memory stick) mounted to the electronic device 100.

In particular, the memory 110 may be stored with a neural network model and a software module such as a text encoder for transforming text into a vector, an audio encoder for transforming the audio signal into a vector, a text decoder for transforming the vector into text, and an audio decoder for transforming the vector to an audio signal, or the like.

Various information required within a range for achieving the purpose of the disclosure may be stored in the memory 110, and information stored in the memory 110 may be received from an external device and updated based on the user input. For example, audio data and text data may be stored in the memory 110, and vector information corresponding to the audio data and vector information corresponding to the text data may be stored.

The processor 120 controls the overall operation of the electronic device 100. Specifically, the processor 120 may control the operation of the electronic device 100 by executing at least one instruction stored in the memory 110.

The processor 120 may be implemented as at least one of an application specific integrated circuit (ASIC), an embedded processor, a microprocessor, hardware control logic, a hardware finite state machine (FSM), a digital signal processor (DSP), or the like. The term processor 120 may be used to indicate a central processing unit (CPU), a graphic processing unit (GPU), a main processing unit (MPU), or the like.

The processor 120 may input text and audio signals into a neural network model, read a plurality of weight values included in the plurality of layers constituting the neural network model, and perform a neural network operation based on the input data and the weight value. The neural network computation, wherein the output data may be an audio signal corresponding to the input text or text corresponding to the input audio signal.

Figure 9:
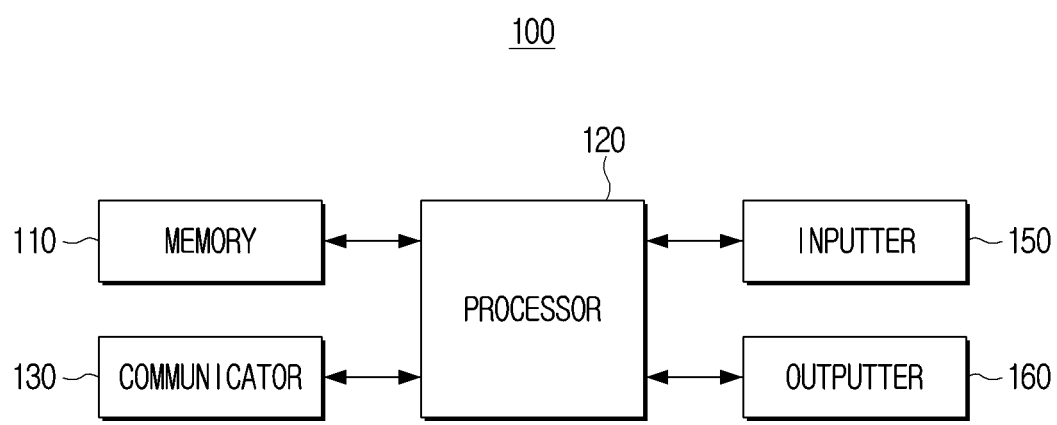
FIG. 9 is a detailed block diagram illustrating an electronic device according to an embodiment of the disclosure.

FIG. 9 is a detailed block diagram illustrating an electronic device according to an embodiment of the disclosure.

Referring to FIG. 9, the electronic device 100 according to an embodiment may include the memory 110, the communicator 130, an inputter 150, an outputter 160, and the processor 120. Hereinafter, the above description and the overlapping portion will be omitted or described with reference to FIG. 3.

The communicator 130 may include a circuit and may communicate with an external device. Specifically, the processor 120 may receive various data or information from an external device connected through the communicator 130, and may transmit various data or information to an external device.

The communicator 130 may include at least one of a Wi-Fi module, a Bluetooth module, a wireless communication module, and a near field communication (NFC) module. Each of the Wi-Fi module and the Bluetooth module may perform communication in a Bluetooth manner or in a Bluetooth manner. The wireless communication module may communicate according to various communication specifications such as IEEE, Zigbee, $3^{rd}$ generation (3G), $3^{rd}$ generation partnership project (3GPP), long term evolution (LTE), 5th generation (5G), or the like. The NFC module may communicate by the NFC method using a 13.56 MHz band among various RF-ID frequency bands such as 135 kHz, 13.56 MHz, 433 MHz, 860-960 MHz, 2.45 GHz, or the like.

The outputter 160 includes a circuit, and the processor 120 may output various information through the outputter 160. The outputter 160 may include at least one of a display and a speaker.

The display may display various screens by the control of the processor 120. As an example, the display may display text by control of the processor 120. Here, the text may be text output by the neural network model.

The display may be implemented as a liquid crystal display panel (LCD), organic light emitting diode (OLED) display, or the like, and the display may be implemented as a flexible display, a transparent display, or the like, according to use cases. The display according to the disclosure is not limited to a specific type.

The speaker may output audio signal by the control of the processor 120. The audio signal may be an audio signal outputted by the neural network model.

In various embodiments according to the disclosure, the processor 120 may provide output data to the user via the outputter 160. The processor 120 may visually provide output data to the user via the display, and may provide output data to the user in the form of a voice signal via the speaker.

The inputter 150 includes a circuit, and the processor 120 may receive a user command for controlling the operation of the electronic device 100 through the inputter 150. Specifically, the inputter 150 may include a microphone, a camera, or a signal receiver. The inputter 150 may be implemented as a touch screen in a form included in the display.

In various embodiments according to the disclosure, the processor 120 may receive a user command to initiate the operation of the processor 120 in accordance with the disclosure via the inputter 150. The processor 120 may receive a user command for providing output data corresponding to the input data through the neural network model via the inputter 150.

The neural network model may include a plurality of neural network layers. Each of the layers includes a plurality of weight values, and the processor 120 may perform a neural network processing operation through an operation leveraging result of a previous layer and a plurality of weight values. Examples of a neural network includes convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), deep Q-networks, or the like, and the neural network model of the disclosure is not limited to the above example.

The processor 120 may train the neural network model through learning algorithm. Examples of learning algorithms include, but are not limited to, supervised learning, unsupervised learning, semi-supervised learning, or reinforcement learning, and the learning algorithm of the disclosure is not limited to the above example.

Figure 10:
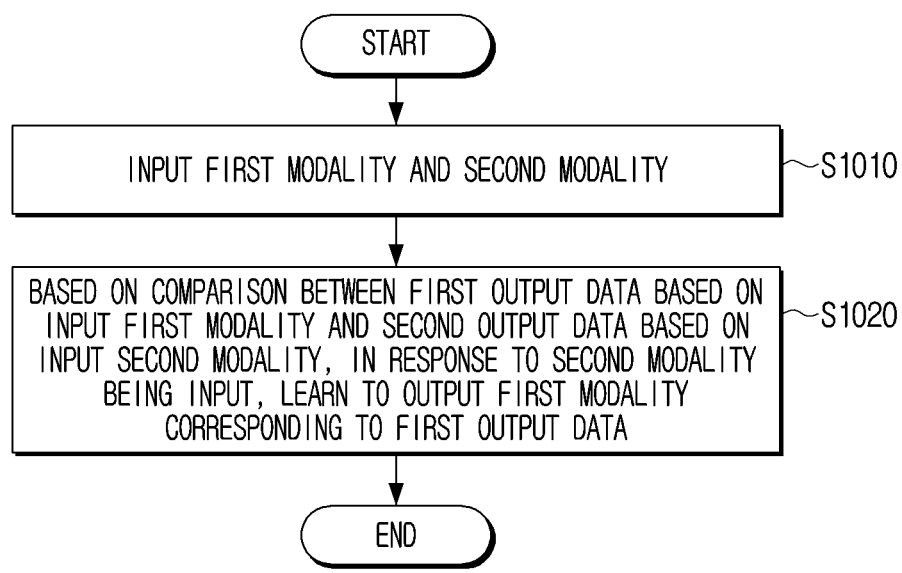
FIG. 10 is a diagram illustrating a method for controlling an electronic device according to an embodiment of the disclosure.

FIG. 10 is a diagram illustrating a method for controlling an electronic device according to an embodiment of the disclosure.

The electronic device 100 may input first modality and second modality to the neural network model in operation S1010. One of the first modality and the second modality may be a text, and other one may be an audio signal.

The electronic device 100 may, based on comparison between first output data based on input first modality and second output data based on input second modality, in response to the second modality being input, train the neural network model to output the first modality corresponding to the first output data in operation S1020.

The electronic device 100 may tokenize the text into a plurality of text elements, and may segment the audio signal into a plurality of audio elements. The electronic device 100 may mask at least one of the plurality of text elements or at least one of the plurality of audio elements.

The electronic device 100 may input the first text composed of tokenized text elements and the first audio signal in which at least one of the segmented plurality of audio elements is masked, to the neural network model.

In this case, the neural network model may output a second audio signal corresponding to the first text and a second text corresponding to the first audio signal.

The neural network model may learn to output a first text corresponding to a second audio signal when a first audio signal including the at least one masking element is input based on a comparison of the second audio signal and the second text.

The neural network model may perform learning, based on identification that the text corresponding to the second audio signal is not output with the output of the first audio signal including the at least one masking element, based on comparison between a plurality of audio elements included in the second audio signal and a plurality of text elements included in the second text.

The neural network model may output a text element corresponding to the masking element through the learning.

Alternatively, the electronic device 100 may input a first audio signal composed of a plurality of segmented audio elements and a first text masked with at least one of a plurality of tokenized text elements into the neural network model.

In this case, the neural network model may output a second text corresponding to the first audio signal and a second audio signal corresponding to the first text.

The neural network model may, based on the first text including at least one masking element being input, be trained to output the first audio signal corresponding to the second text based on the comparison between the second text and the second audio signal.

The neural network model may perform learning, based on identification that the text corresponding to the second audio signal is not output with the output of the first audio signal including the at least one masking element, based on comparison between a plurality of audio elements included in the second audio signal and a plurality of text elements included in the second text.

The neural network model may output a text element corresponding to the masking element through the learning.

The methods according to various embodiments of the disclosure described above may be implemented with only software/hardware upgrade for an existing electronic device.

In addition, the various embodiments of the disclosure described above may be implemented through an embedded server provided in an electronic device, or an external server.

The controlling method of the electronic device according to various embodiments may be implemented as a program and stored in various recording media. A computer program processed by various processors to execute the various controlling methods described above may be used in a state in which a computer program capable of executing the various control methods described above is stored in a recording medium.

The non-transitory computer-readable medium does not refer to a medium that stores data for a short period of time, such as a register, cache, memory, etc., but semi-permanently stores data and is available of reading by the device. Specifically, programs of performing the above-described various methods can be stored in a non-transitory computer readable medium such as a CD, a DVD, a hard disk, a Blu-ray disk, universal serial bus (USB), a memory card, ROM, or the like, and can be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a memory storing a neural network model; and
   a processor configured to input, to the neural network model, input data to obtain output data,
   wherein, based on comparison between first output data based on input first modality and second output data based on input second modality, in response to the second modality being input, to output the first modality corresponding to the first output data based on the neural network model,
   wherein the second modality comprises at least one masking element,
   wherein the first modality comprises a first text and the second modality comprises a first audio signal, and
   wherein the neural network model is configured to:
      output a second audio signal corresponding to the first text and a second text corresponding to the first audio signal with the first text composed of a plurality of tokenized text elements and the first audio signal in which at least one of segmented plurality of elements is masked as input data, and
      based on a first audio signal comprising the at least one masking element being input based on the comparison of the second audio signal and the second text, output a first text corresponding to the second audio signal.

2. The electronic device of claim 1, wherein one of the first modality and the second modality is a text, and the other one of the first modality and the second modality is an audio signal.

3. The electronic device of claim 2, wherein the neural network model is configured to:
   tokenize the text into a plurality of text elements,
   segment the audio signal into a plurality of audio elements, and
   mask at least one of the plurality of text elements or at least one of the plurality of audio elements.

4. The electronic device of claim 1, wherein the neural network model performs learning, based on identification that the first text corresponding to the second audio signal is not output with the output of the first audio signal including the at least one masking element, based on comparison between a plurality of audio elements included in the second audio signal and a plurality of text elements included in the second text.

5. The electronic device of claim 1, wherein the neural network model is configured to output a text element corresponding to the at least one masking element.

6. The electronic device of claim 1,
   wherein the first modality comprises a first audio signal and the second modality comprises a first text, and
   wherein the neural network model is configured to:
      output a second text corresponding to the first audio signal and a second audio signal corresponding to the first text, with the first audio signal composed of a plurality of segmented audio elements and the first text in which at least one of tokenized plurality of elements is masked as input data, and
      based on a first text signal comprising the at least one masking element being input based on the comparison of the second text and the second audio signal, output a first audio signal corresponding to the second text.

7. The electronic device of claim 6, wherein the neural network model performs learning, based on identification that the first audio signal corresponding to the second text is not output with the output of the first text including the at least one masking element, based on comparison between a plurality of text elements included in the second text and a plurality of audio elements included in the second audio signal.

8. The electronic device of claim 6, wherein the neural network model is configured to output an audio element corresponding to the masking element through training.

9. A method of controlling an electronic device, the method comprising:
   inputting input data to a neural network model; and
   obtaining output data for the input data through computation of the neural network model,
   based on comparison between first output data based on input first modality and second output data based on input second modality, in response to the second modality being input, outputting, by the neural network model, the first modality corresponding to the first output data,
   wherein the second modality comprises at least one masking element,
   wherein the first modality comprises a first text and the second modality comprises a first audio signal, and
   wherein the method further comprises:
      outputting a second audio signal corresponding to the first text and a second text corresponding to the first audio signal with the first text composed of a plurality of tokenized text elements and the first audio signal in which at least one of segmented plurality of elements is masked as input data, and
      based on a first audio signal comprising the at least one masking element being input based on the comparison of the second audio signal and the second text, outputting a first text corresponding to the second audio signal.

10. The method of claim 9, wherein one of the first modality and the second modality is a text, and the other one of the first modality and the second modality is an audio signal.

11. The method of claim 10, wherein the text is tokenized into a plurality of text elements, the audio signal is segmented into a plurality of audio elements, and at least one of the plurality of text elements or at least one of the plurality of audio elements are masked and input to the neural network model.

12. The method of claim 9, further comprising training the neural network model based on identification that the first text corresponding to the second audio signal is not output with the output of the first audio signal including the at least one masking element, based on comparison between a plurality of audio elements included in the second audio signal and a plurality of text elements included in the second text.

13. The method of claim 9, further comprising the neural network model outputting a text element corresponding to the masking element.

\* \* \* \* \*